(No Model.)

W. DURAND.
RING GAGE.

No. 439,774. Patented Nov. 4, 1890.

Witnesses
Oscar A. Michel.
Chas. R. Michel.

Inventor
Wallace Durand,
By Drake & Co. Atty

UNITED STATES PATENT OFFICE.

WALLACE DURAND, OF NEWARK, NEW JERSEY.

RING-GAGE.

SPECIFICATION forming part of Letters Patent No. 439,774, dated November 4, 1890.

Application filed June 14, 1890. Serial No. 355,493. (No model.)

*To all whom it may concern:*

Be it known that I, WALLACE DURAND, a citizen of the United States, residing at Newark, in the county of Essex and State of New Jersey, have invented certain new and useful Improvements in Ring-Measuring Devices or Gages; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to enable finger-rings and similar articles to be measured with greater accuracy and with facility and convenience; and it consists in the improved ring-gage and in the arrangements and combinations of parts, substantially as will be hereinafter set forth, and finally embodied in the clauses of the claim.

Figure 1:
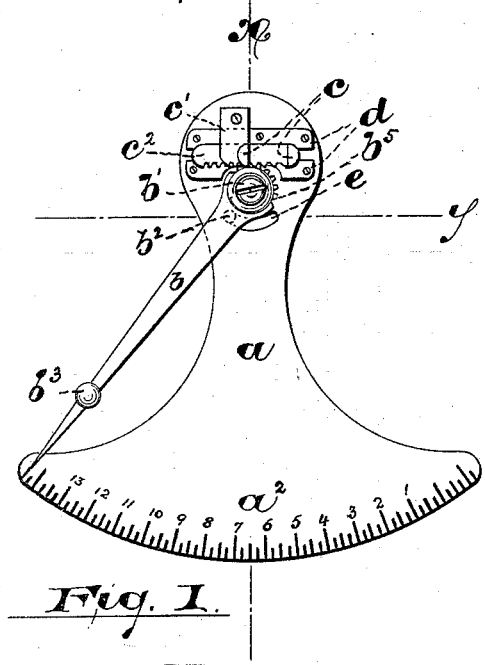
Figure 2:
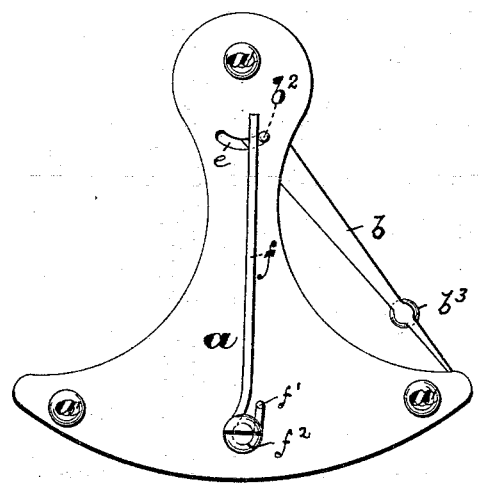
Figure 3:
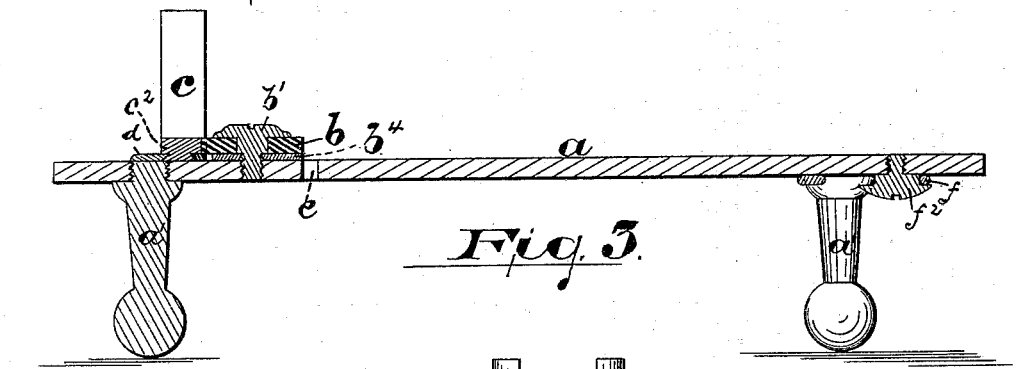
Figure 4:
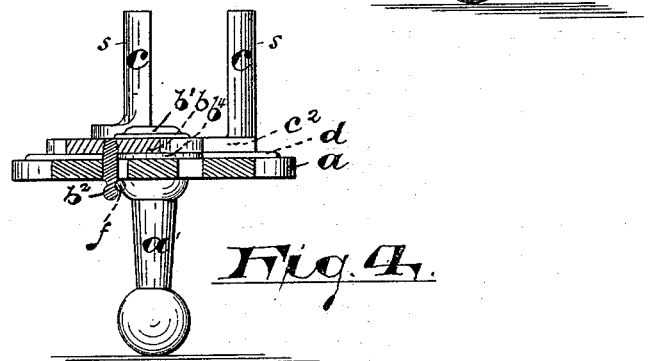

Referring to the accompanying drawings, in which like letters indicate corresponding parts in each of the several figures, Figure 1 is a top plan of the device; Fig. 2, a plan of the under side thereof; Fig. 3, an enlarged sectional view taken on line $x$, and Fig. 4 a section on line $y$.

In said drawings, $a$ indicates a suitable table or plate, which may be supported by feet or standards $a'$ $a'$. The said standards elevate the table or plate above the counter or show-case of the jeweler and allow a free movement of the spring and other working parts beneath said table. On the upper face of said plate is arranged or formed a scale $a^2$, to indicate the size of the thing measured by the gage. On said plate is pivoted a hand or pointer $b$, the screw $b'$ being the pivot on which said pointer has its center of movement. The said hand, at its pivoted end, is provided or has formed thereon a cogged segment $b^5$, which engages a rack $c^2$, arranged in bearings or ways $d$ $d$. Said rack is adapted to slide in a straight course when the hand is turned, as will be clearly understood upon inspection of Fig. 1. Adjacent to said sliding rack is arranged a fixed bracket or support $c'$ for a stationary vertical finger $c$, and on the sliding rack is arranged a similar finger parallel with the first, which is movable with said rack to and from the said fixed finger. When the two said vertical and parallel fingers are together, they will enter and measure the smallest size of a ring ordinarily placed on the market, and the hand or pointer will lie at 1.

The tendency of the hands is to separate automatically, so that the fingers will press hard against the interior sides of the ring. This is accomplished by means of a spring $f$, arranged in any suitable manner. The preferred method of arranging the spring is shown in Fig. 2, where said spring is shown to be secured on the under side of the plate $a$ by means of a screw $f^2$ or other fastener, the end of the spring entering the plate, as at $f'$, Fig. 2, to prevent any pivotal movement on the said screw. The free end of the spring engages a pin or bearing $b^2$, extending from the under side of the hand or pointer $b$ through a curved slot $e$ in the bed or plate $a$, and thus the hand or pointer is pressed laterally toward the higher figures of the scale $a^2$, and the sliding rack is moved in its bearings, so separating the fingers, as will be understood.

The outer measuring-surfaces $s$ of the separable fingers $c$ are vertically parallel, and thus should the ring be provided with a large ornamental head—such as are found on the ordinary seal-rings—there will be no interference with accurate measurements, as is common to the conical ring-measuring devices heretofore commonly in use. Furthermore, by my improvements I am able to measure the varying diameters of oblong or irregularly-shaped rings with accuracy. The inner surfaces of the fingers may be employed in measuring the outside diameter and the thickness of the ring, and thus the rings may be manufactured complete from a written order without the trouble, expense, and inconvenience occasioned by the use of sample rings.

I may employ the improved device in measuring bracelets and other articles than finger-rings.

Having thus described the invention, what I claim as new is—

1. The improved ring-gage, combining a scale, a pivoted pointer to indicate the measurement on said scale, and fingers having outside measuring-surfaces to engage the interior of the ring, one of said fingers being movable with the indicating hand or pointer, substantially as set forth.

2. The improved ring-gage provided with fingers having on the outer sides measuring-surfaces to engage the interior of the ring in measuring, one of said fingers being movable and operable with an indicating-hand, said indicating-hand, a scale, and a spring having a normal tendency to separate said fingers, said parts being arranged and combined substantially as and for the purposes set forth.

3. The improved finger-ring gage, combining a plate provided with legs or standards, and on the upper side a scale, an indicating-hand pivoted on the said plate and having a pin or extension to engage a spring, said spring arranged on the under side of said plate, a toothed segment, a fixed finger, and a movable finger arranged on a sliding rack, all said parts being arranged and combined substantially as and for the purposes set forth.

4. The improved ring-gage herein described, combining with a table having standards, measuring-fingers disposed on the upper face of said table, an indicating hand or pointer, and a scale, substantially as set forth.

5. The improved ring-gage herein described, combining a table supported by standards and having on the upper side thereof a scale and ways $d\,d$, a rack sliding in said ways and having a finger movable therewith, a fixed finger, and a pivoted and cogged pointer or hand engaging said rack and indicating the measurement on said scale, substantially as set forth.

6. The improved measuring device, combining the slotted plate $a$, having scale $a^2$, ways $d$, and a fixed finger, a rack having a finger movable therewith, and a hand adapted to move said rack and having a pin or bearing extending through the slot in said plate, and a spring arranged on the under side of said plate $a$ and engaging said pin or bearing, substantially as and for the purposes set forth.

7. In combination with a plate having a scale on the upper face thereof, a hand or pointer pivoted on said upper face, and fingers having on their outer opposite sides measuring-surfaces to engage the interior sides of the ring, the movement of the fingers controlling the movement of the hand or pointer, substantially as and for the purposes set forth.

In testimony that I claim the foregoing I have hereunto set my hand this 10th day of June, 1890.

WALLACE DURAND.

Witnesses:
CHARLES H. PELL,
W. B. DURAND.